(12) United States Patent
Epping et al.

(10) Patent No.: US 12,019,882 B2
(45) Date of Patent: Jun. 25, 2024

(54) FORCE PROVISIONING VIRTUAL OBJECTS IN DEGRADED STRETCHED CLUSTERS

(71) Applicant: VMware LLC, Palo Alto, CA (US)

(72) Inventors: Duncan Epping, Helmond (NL); Frank Denneman, Purmerend (NL); Cormac Hogan, Cork (IE)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/526,130

(22) Filed: Nov. 15, 2021

(65) Prior Publication Data

US 2023/0152992 A1 May 18, 2023

(51) Int. Cl.
*G06F 3/06* (2006.01)

(52) U.S. Cl.
CPC .......... *G06F 3/0631* (2013.01); *G06F 3/0604* (2013.01); *G06F 3/0664* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126;

(Continued)

(56) References Cited

U.S. PATENT DOCUMENTS 7,502,884 B1 * 3/2009 Shah ....................... G06F 13/12
710/316
9,015,709 B2 * 4/2015 Voccio ................ G06F 9/45533
718/1

(Continued)

OTHER PUBLICATIONS

Definition virtual machine (VM); Robert Sheldon; Mar. 2021; retrieved from https://www.techtarget.com/searchitoperations/definition/virtual-machine-VM on Jan. 10, 2023 (Year: 2021).*

(Continued)

*Primary Examiner* — Daniel C. Chappell
(74) *Attorney, Agent, or Firm* — Quarles & Brady LLP (57) ABSTRACT

The present disclosure is related to methods, systems, and machine-readable media for force provisioning virtual objects in degraded stretched clusters. A request to provision a virtual object by a stretched cluster according to a storage policy specified as part of the request can be received by a software defined data center (SDDC). The cluster can include a plurality of sites. An insufficiency of storage policy resources to satisfy the storage policy specified for the virtual object can be determined. The virtual object can be force provisioned responsive to determining storage policy resources sufficient to satisfy the storage policy at one of the plurality of sites.

18 Claims, 5 Drawing Sheets

```
┌─────────────────────────────────────────────────────────────┐
│ RECEIVING, BY A SDDC, A REQUEST TO PROVISION A VIRTUAL      │
│ OBJECT BY A STRETCHED CLUSTER ACCORDING TO A STORAGE        │──648
│ POLICY SPECIFIED AS PART OF THE REQUEST, WHEREIN THE        │
│ STRETCHED CLUSTER INCLUDES A PLURALITY OF SITES             │
└─────────────────────────────────────────────────────────────┘
                              │
┌─────────────────────────────────────────────────────────────┐
│ DETERMINING AN INSUFFICIENCY OF STORAGE POLICY RESOURCES    │──650
│ TO SATISFY THE STORAGE POLICY SPECIFIED FOR THE VIRTUAL     │
│ OBJECT                                                      │
└─────────────────────────────────────────────────────────────┘
                              │
┌─────────────────────────────────────────────────────────────┐
│ FORCE PROVISIONING THE VIRTUAL OBJECT RESPONSIVE TO         │──652
│ DETERMINING STORAGE POLICY RESOURCES SUFFICIENT TO SATISFY  │
│ THE STORAGE POLICY AT ONE OF THE PLURALITY OF SITES         │
└─────────────────────────────────────────────────────────────┘
```

(58) Field of Classification Search
CPC ......... G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 9,183,101 | B2* | 11/2015 | Gondi | G06F 11/2033 |
| 9,524,111 | B1* | 12/2016 | Manden | G06F 3/0631 |
| 9,582,328 | B1* | 2/2017 | Tao | G06F 9/5072 |
| 9,806,896 | B2* | 10/2017 | Xiang | H04L 1/1896 |
| 9,852,114 | B2* | 12/2017 | Wang | G06F 40/106 |
| 10,148,498 | B1* | 12/2018 | Gould | H04L 67/1095 |
| 10,223,024 | B2* | 3/2019 | Sharma | G06F 3/0604 |
| 10,372,363 | B2* | 8/2019 | Gupta | G06F 3/0653 |
| 10,782,880 | B2* | 9/2020 | Kim | G06F 3/0631 |
| 10,880,367 | B2* | 12/2020 | Shang | H04L 41/0816 |
| 10,949,238 | B2* | 3/2021 | Dai | G06F 9/5077 |
| 2011/0213908 | A1* | 9/2011 | Bennett | G06F 13/1684 710/305 |
| 2013/0019016 | A1* | 1/2013 | Anderson | G06F 9/5077 709/226 |
| 2015/0058298 | A1* | 2/2015 | Earl | G06F 11/1484 707/674 |
| 2015/0212910 | A1* | 7/2015 | Gondi | G06F 11/2069 714/6.3 |
| 2016/0094356 | A1* | 3/2016 | Xiang | H04L 1/165 370/390 |
| 2017/0255363 | A1* | 9/2017 | Daloukov | G06F 3/04847 |
| 2019/0324820 | A1* | 10/2019 | Krishnan | G06F 9/505 |
| 2019/0327144 | A1* | 10/2019 | Tembey | G06F 9/45558 |
| 2020/0201665 | A1* | 6/2020 | Panse | G06F 9/5077 |
| 2020/0233715 | A1* | 7/2020 | Kottapalli | G06F 9/5027 |
| 2020/0236159 | A1* | 7/2020 | Shang | H04L 41/5025 |
| 2020/0241910 | A1* | 7/2020 | Verma | G06F 9/5044 |
| 2020/0374203 | A1* | 11/2020 | Kottapalli | H04L 41/0893 |

OTHER PUBLICATIONS

Cost-Optimized VSAN Cluster for the Edge on Dell Precision; vmware; 2019; retrieved from https://www.cohesity.com/resource-assets/reference-architecture/Resilient-and-Scalable-File-Service-on-VMware-vSA-with-Cohesity.pdf on Feb. 1, 2024 (Year: 2019).*

VMware Cloud on AWS—The Importance of Policies; Kev Johnson; Aug. 8, 2019; retrieved from https://blogs.vmware.com/vsphere/2019/08/vmware-cloud-on-aws-policies.html on Feb. 1, 2024 (Year: 2019).*

VMware vSAN Design Guide; vmware; Nov. 30, 2020; retrieved from https://web.archive.org/web/20201130212511/https://core.vmware.com/resource/vmware-vsan-design-guide#sec6-sub5 on Feb. 1, 2024 (Year: 2020).*

* cited by examiner

FORCE PROVISIONING VIRTUAL OBJECTS IN DEGRADED STRETCHED CLUSTERS

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

A software defined data center (SDDC) can include objects, which may be referred to as virtual objects. Virtual objects, such as virtual computing instances (VCIs), for instance, have been introduced to lower data center capital investment in facilities and operational expenses and reduce energy consumption. A VCI is a software implementation of a computer that executes application software analogously to a physical computer. Virtual objects have the advantage of not being bound to physical resources, which allows virtual objects to be moved around and scaled to meet changing demands of an enterprise without affecting the use of the enterprise's applications. In a software defined data center, storage resources may be allocated to virtual objects in various ways, such as through network attached storage (NAS), a storage area network (SAN) such as fiber channel and/or Internet small computer system interface (iSCSI), a virtual SAN, and/or raw device mappings, among others.

A storage policy can be specified for a virtual object. In the absence of resources sufficient to satisfy a storage policy, previous approaches may force provision the object with the simplest possible layout. Such approaches may leave the object with a low level of protection.

DETAILED DESCRIPTION

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

Where the present disclosure refers to VCIs, the examples given could be any type of virtual object, including data compute node, including physical hosts, VCIs, non-VCI containers, virtual disks, and hypervisor kernel network interface modules. Embodiments of the present disclosure can include combinations of different types of virtual objects (which may simply be referred to herein as "objects"). As used herein, a container encapsulates an application in a form that's portable and easy to deploy. Containers can run without changes on any compatible system—in any private cloud or public cloud—and they consume resources efficiently, enabling high density and resource utilization. Although containers can be used with almost any application, they may be frequently associated with microservices, in which multiple containers run separate application components or services. The containers that make up microservices are typically coordinated and managed using a container orchestration platform.

As used herein, a "disk" is a representation of storage policy resources that are used by an object. As used herein, "storage policy resource" includes secondary or other storage (e.g., mass storage such as hard drives, solid state drives, removable media, etc., which may include non-volatile memory). The term "disk" implies a single physical memory device being used by an object.

A cluster is a collection of hosts and associated virtual machines intended to work together as a unit. A stretched cluster is a cluster spanning more than one site (e.g., geographic location). A stretched cluster can provide a higher level of availability and intersite load balancing. Stretched clusters may typically be deployed in environments where the distance between data centers is limited, such as metropolitan or campus environments. Stretched clusters can be used to manage planned maintenance and avoid disaster scenarios, because maintenance or loss of one site does not affect the overall operation of the cluster. In a stretched cluster configuration, both sites are active sites. If either site fails, the storage on the other site can be used. A stretched cluster can be said to be in a "degraded state" when one or more hosts of that cluster have failed.

When an object, such as a container, is created or modified, a storage policy for that VCI may be specified. This specification may be made by a user (e.g., a customer). A storage policy, as referred to herein, is a policy that defines storage requirements for an object. Storage requirements can refer to stripe width and/or mirror quantity, among other requirements. A storage policy can determine how the objects are provisioned and allocated within a datastore to provide a desired level of performance and/or availability.

A Redundant Array of Independent (or Inexpensive) Disks (RAID) can employ a flexible stripe width and can allow for flexible quantities of mirrors. RAID is an umbrella term for computer information storage schemes that divide and/or replicate information among multiple memory devices, for instance. The multiple memory devices in a RAID array may appear to a user and the operating system of a computer as a single memory device (e.g., disk). RAID can include striping (e.g., splitting) information so that different portions of the information are stored on different memory devices. The portions of the more than one device that store the split data are collectively referred to as a stripe. In contrast, RAID can also include mirroring, which can include storing duplicate mirrors (e.g., copies) of data on more than one device.

A storage policy can specify a stripe width and/or a mirror quantity. A stripe width, which may alternatively be referred to as a number of stripes per object, is a quantity of memory devices (e.g., disks) across which each replica of an object is striped. For example, a stripe width can range from 1 to 12. Stripes may be spread across memory devices of the same or different types, such as magnetic disks, flash devices, or other memory device types, such as those described with respect to the memory resources 510 illustrated in FIG. 5. Mirror quantity refers to a quantity of mirrors (e.g., copies) of data. Mirror quantity can refer to a single mirror or to a plurality of mirrors. For instance, RAID 1 can be configured with one or more mirrors of a set of data on one or more separate disks.

Whether a storage policy specified for an object can be satisfied by a software defined datacenter depends on the availability of storage policy resources. Storage policy resources can refer to a quantity of disks and/or an amount of disk space. Thus, a storage policy may not be satisfiable if storage policy resources are insufficient (e.g., unavailable). It is noted that storage policy resources may be simply referred to herein as "resources."

If, however, force provisioning is enabled by a policy setting, the object can be force provisioned and deployed. Force provisioning means that the object is provisioned with resources other than those specified in the storage policy for the object. However, consumers may not be provided the ability to create or edit a storage policy, and may not be aware of infrastructure layer failures. Further, in a stretched cluster configuration, previous approaches may only provide two options: failure of deployment, or deployment without any protection when force provisioning is enabled. Stated differently, if a user desires to create an object and selects a storage policy, the provisioning either fails (in the absence of force provisioning), or if there are reasons why the policy cannot be met (e.g., failures in the cluster), the provisioning may succeed but the object created is left with minimal protection.

For example, in previous approaches, force provisioning may include force provisioning objects with the simplest possible layout. For example, force provisioning in previous approaches may include a single component RAID 0 configuration with no performance or protection. In previous approaches, if a storage policy specified a RAID 1 mirrored copy of data but there were insufficient resources to satisfy this specification, no attempt to create even a single RAID 1 mirror would be made; rather, a RAID 0 object would be provisioned, which provides no protection.

In an example, a stretched cluster includes a first site and a second site, each having four hosts. A storage policy specifies that an object be provisioned with RAID-1 across the two sites and within each site. A failure of a single host at the first site does not affect the provisioning because resources are still sufficient to satisfy the policy.

A failure of two hosts at the first site differs, however. If force provisioning is not enabled, the object will not be provisioned as there are insufficient resources to satisfy the policy. Stated differently, if a failure in a stretched cluster would prevent the creation of the fully requested RAID configuration as specified within the policy, then provisioning may be fully blocked. In an environment where there are little to no transient workloads, this may be desirable. However, in an environment with transient workloads, it may be more important that objects get created (rather than not created), as blocking their creation could negatively impact efficiency. An example of transient workloads is a "persistent volume," which may be requested by developers during the provisioning of containerized applications, for instance.

If force provisioning is enabled, the object (under previous approaches) may be provisioned across sites with RAID-0, within the first site with RAID-0, and within the second site with RAID-0. As a result, the object is provisioned but does not adhere to the specified policy in any respect. As a result, until the failure is resolved, the object(s) will run without any resiliency within each of the stretched cluster sites. If the two failed hosts subsequently come back online the RAID configurations for both the first site and the second site may then be rebuilt to RAID-1 in order to adhere to the specified policy. This rebuilding involves costly traffic and stress to the SDDC.

Embodiments of the present disclosure include a "smart forced provisioning" for stretched clusters that can allow the provisioning of objects regardless of an infrastructure failure, while providing the highest possible level of protection in this degraded state. For instance, in some embodiments, an object is provisioned when at least one full RAID tree is available in at least one configured site of the stretched cluster, even though the stretched cluster—and subsequently the object—is in a degraded state.

It is noted that each object can be deployed as a RAID tree where each branch of the tree is a component. For instance, if a virtual disk is deployed with a stripe width of two, then a RAID-0 stripe would be configured across two, or more, physical devices (e.g., disks) for this virtual disk. The virtual disk would be the object, and each of the stripes of the virtual disk would be a component of that object. In a stretched cluster, a VCI may be configured (via, e.g., a VCI-level storage policy) to be stretched across sites from a storage perspective, such that the VCI's associated storage objects (e.g., virtual disk (VMDK) objects, namespace object, swap objects, etc.) are replicated via RAID-1 mirroring at each site. In addition, the replica copies maintained at each site may be further protected, within that individual site, via RAID-1 mirroring or RAID-5/6 parity striping. In an example, a VCI with a storage object (e.g., a VMDK) is deployed in a stretched cluster according to a storage policy specifying a "Primary Failures to Tolerate" (PFTT) parameter value of 1 (indicating that the VCI is a stretched VCI and thus its storage objects should be replicated across sites)

and a "Secondary Failures to Tolerate" (SFTT) parameter value of 1 (indicating that the VCI's storage objects should be protected by RAID-1 mirroring within each site). Per the PFTT parameter value of 1, a replica copy of the storage object is stored at each site of the cluster. Further, per the SFTT parameter value of 1, the replica copy at each site is mirrored via RAID-1 within that site.

As previously discussed, embodiments herein can provision an object when at least one full RAID tree is available in at least one configured site of the stretched cluster, even though the stretched cluster—and subsequently the object—is in a degraded state. Consider the example above of a stretched cluster including a first site and a second site, each having four hosts, and a storage policy specifying that an object be provisioned with RAID-1 across the two sites and within each site. Embodiments of the present disclosure may create a RAID-0 configuration in the first site as it has two failed hosts, but in the second site with no failed hosts, embodiments herein can create a full RAID-1 configuration. Compared with previous approaches, this provides an extra level of availability because additional failures would be tolerable before the object becomes inaccessible.

After smart force provisioning, in some cases, storage policy resources sufficient to satisfy the storage policy specified for the object may become available. In contrast with previous approaches, embodiments herein may include rebuilding only one RAID configuration, as the first site was the only site that was reduced to RAID-0.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 414 in FIG. 4. As will be appreciated, elements shown in the various embodiments herein can be added, exchanged, and/ or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
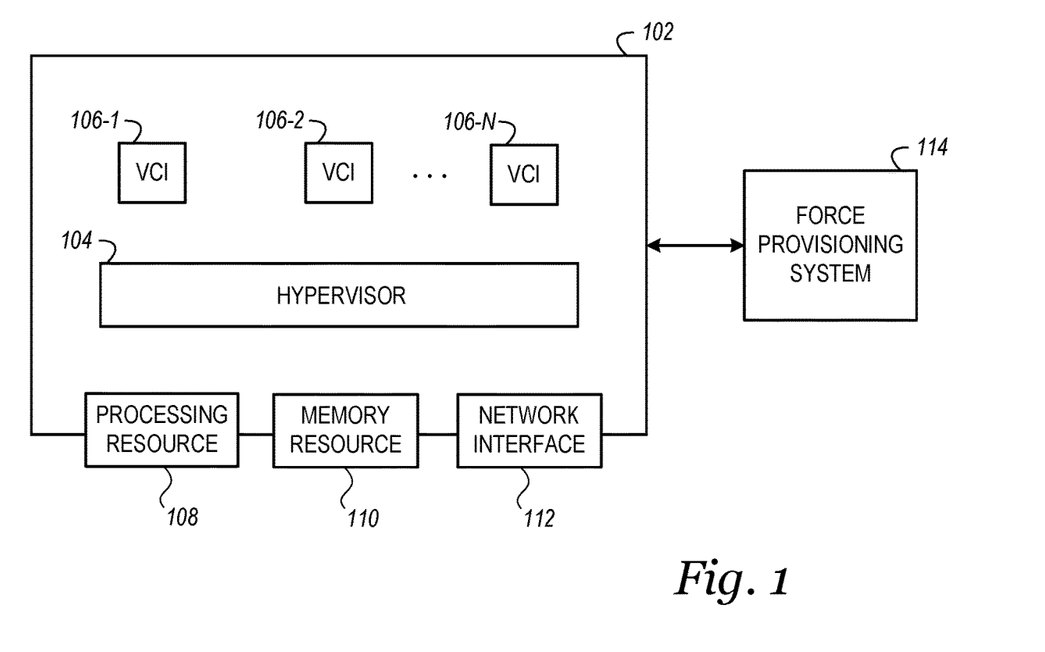
FIG. 1 is a diagram of a host and a system for force provisioning virtual objects in degraded stretched clusters according to one or more embodiments of the present disclosure.

FIG. 1 is a diagram of a host and a system for force provisioning virtual objects in degraded stretched clusters according to one or more embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of virtual computing instances 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. The host 102 can be in communication with a force provisioning system 114. An example of the force provisioning system is illustrated and described in more detail below. In some embodiments, the force provisioning system 114 can be a server, such as a web server.

Figure 2:
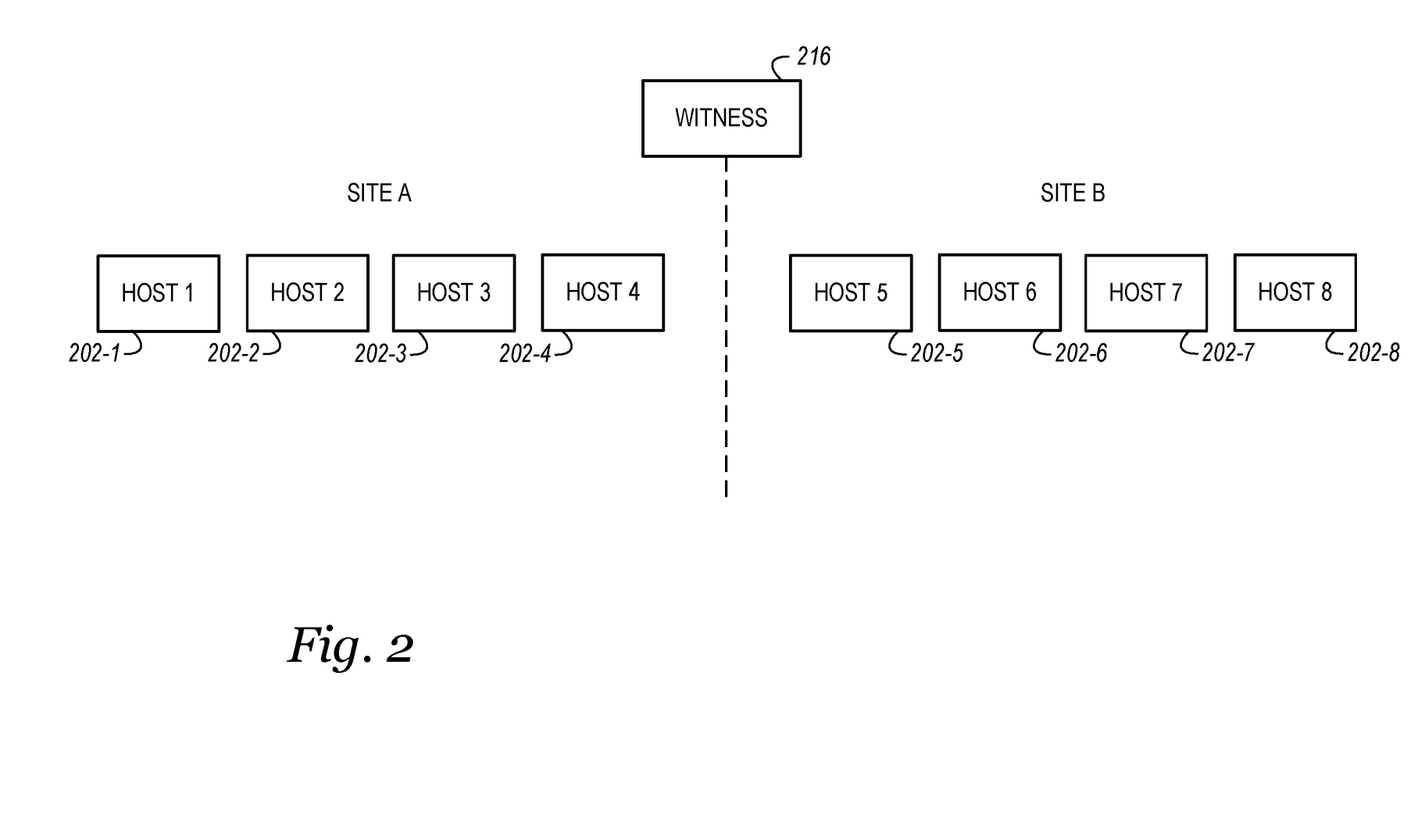
FIG. 2 is a diagram of a stretched cluster according to one or more embodiments of the present disclosure.

FIG. 2 is a diagram of a stretched cluster according to one or more embodiments of the present disclosure. As shown in FIG. 2, the cluster includes a first site (Site A) and a second site (Site B). As shown, Site A includes a first plurality of hosts, including a host1 202-1, a host2, 202-2, a host3 202-3, and a host4 202-4. Site B includes a second plurality of hosts, including a host5 202-5, a host6, 202-6, a host7 202-7, and a host8 202-8. Also illustrated in FIG. 2, the cluster includes a witness host 216. The witness host 216 can reside at a third site and can contains the witness components of virtual machine objects. The witness host 216 can contain only metadata, and does not participate in storage operations. The witness host 216 serves as a tiebreaker when a decision must be made regarding availability of datastore components when the network connection between Site A and Site B is lost. In this case, the witness host typically forms a cluster with the "preferred" site (e.g., Site A). However, if the preferred site becomes isolated from the secondary site and the witness host 216, the witness host 216 forms a cluster using the secondary site. When the preferred site is online again, data is resynchronized to ensure that both sites have the latest copies of all data.

Figure 3:
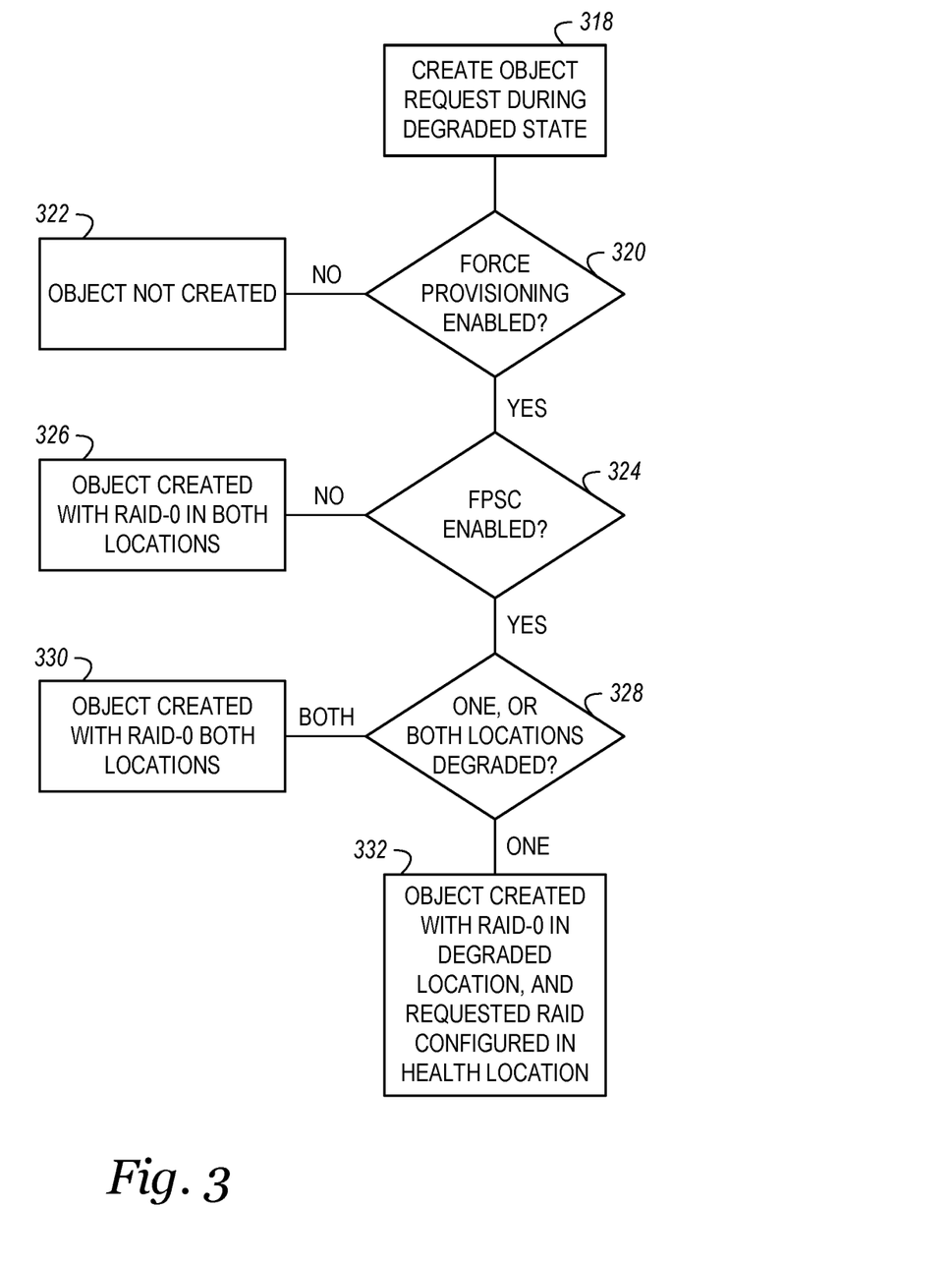
FIG. 3 is a flow chart associated with force provisioning virtual objects in degraded stretched clusters according to one or more embodiments of the present disclosure.

FIG. 3 is a flow chart associated with force provisioning virtual objects in degraded stretched clusters according to one or more embodiments of the present disclosure. At 318, a request to provision (e.g., create) an object during a degraded state is received. Referring back to the example illustrated in FIG. 2, a degraded state may be determined by the failure of two hosts (e.g., host3 202-3 and host4 202-4). At 330, a determination is made regarding whether force provisioning is enabled. If not, the object is not provisioned at 322. If force provisioning is enabled, a determination is made at 324 regarding whether "smart force provisioning" is enabled. If not, the object is provisioned with RAID-0 in both locations (Site A and Site B). If "smart force provisioning" is enabled, a determination is made at 328 of whether one site or both sites are degraded. It is noted that "smart force provisioning" is automatically enabled, in some embodiments. In other embodiments, "smart force provisioning" may be optional and indicated via an interface (e.g., user activation of "smart force provisioning."

If both sites are determined to be degraded, the object is provisioned, at 330, with RAID-0 in both locations. If only one site is determined to be degraded (Site A, in this example), then the object can be provisioned, at 332, with RAID-0 in the degraded site (Site A) and with the requested RAID configuration in the undegraded (e.g., healthy) site (Site B). Stated differently, even though a full RAID tree cannot be configured in Site A, Site A is configured with RAID-0 and, if RAID-1 was specified in the policy, Site B is configured with a full RAID-1 object.

Figure 4:
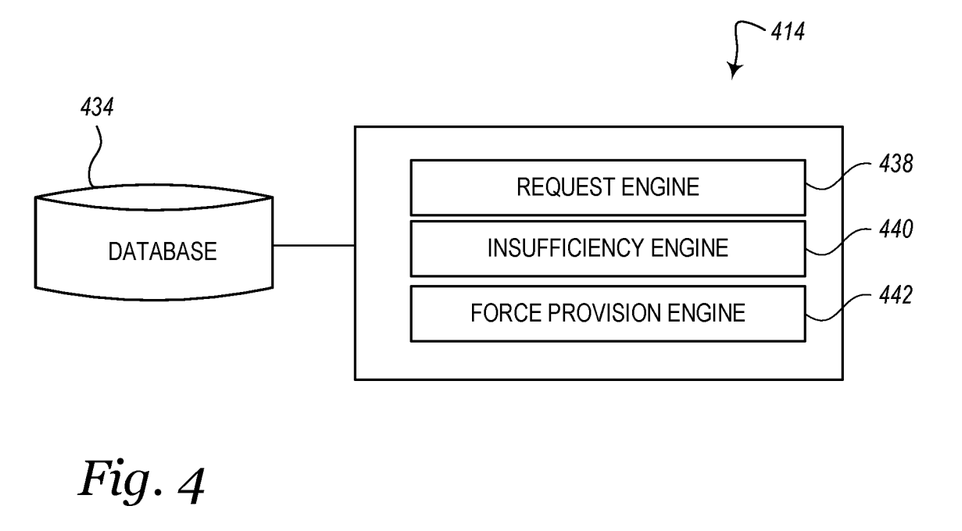
FIG. 4 is a diagram of a system for force provisioning virtual objects in degraded stretched clusters according to one or more embodiments of the present disclosure.

FIG. 4 is a diagram of a system 414 for force provisioning virtual objects in degraded stretched clusters according to one or more embodiments of the present disclosure. The system 414 can include a database 434, a subsystem 436, and/or a number of engines, for example request engine 438, insufficiency engine 440, force provision engine 442, and can be in communication with the database 434 via a communication link. The system 414 can include additional or fewer engines than illustrated to perform the various functions described herein. The system can represent program instructions and/or hardware of a machine (e.g., machine 544 as referenced in FIG. 5, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the request engine 438 can include a combination of hardware and program instructions that is configured to receive, by an SDDC, a request to provision a virtual object by a stretched cluster with a first RAID configuration according to a storage policy specified as part of the request, wherein the stretched cluster includes a first site and a second site. In some embodiments, the insufficiency engine 440 can include a combination of hardware and program instructions that is configured to determine an insufficiency of storage policy resources at the first site to satisfy the RAID configuration specified for the virtual object. In some embodiments, the force provision engine 442 can include a combination of hardware and program instructions that is configured to force provision the virtual object responsive to a determination that storage policy resources at the second site are sufficient to configure a full RAID tree associated with the virtual object.

Figure 5:
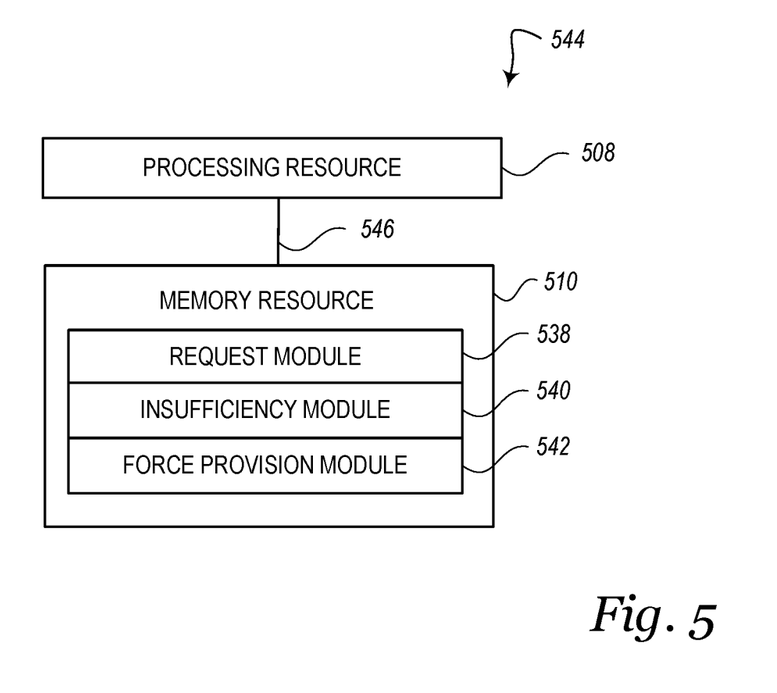
FIG. 5 is a diagram of a machine for force provisioning virtual objects in degraded stretched clusters according to one or more embodiments of the present disclosure.

FIG. 5 is a diagram of a machine 544 for force provisioning virtual objects in degraded stretched clusters according to one or more embodiments of the present disclosure. The machine 544 can utilize software, hardware, firmware, and/or logic to perform a number of functions. The machine 544 can be a combination of hardware and program instructions configured to perform a number of functions (e.g., actions). The hardware, for example, can include a number of processing resources 508 and a number of memory resources 510, such as a machine-readable medium (MRM) or other memory resources 510. The memory resources 510 can be internal and/or external to the machine 544 (e.g., the machine 544 can include internal memory resources and have access to external memory resources). In some embodiments, the machine 544 can be a VCI. The program instructions (e.g., machine-readable instructions (MRI)) can include instructions stored on the MRM to implement a particular function (e.g., an action such as configuring a full RAID tree associated with a virtual object at a second site, as described herein). The set of MRI can be executable by one or more of the processing resources 508. The memory resources 510 can be coupled to the machine 544 in a wired and/or wireless manner. For example, the memory resources 510 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 510 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 508 can be coupled to the memory resources 510 via a communication path 546. The communication path 546 can be local or remote to the machine 544. Examples of a local communication path 546 can include an electronic bus internal to a machine, where the memory resources 510 are in communication with the processing resources 508 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 546 can be such that the memory resources 510 are remote from the processing resources 508, such as in a network connection between the memory resources 510 and the processing resources 508. That is, the communication path 546 can be a network connection. Examples of such a network connection can include a local area network (LAN), wide area network (WAN), personal area network (PAN), and the Internet, among others.

As shown in FIG. 5, the MRI stored in the memory resources 510 can be segmented into a number of modules 538, 540, 542 that when executed by the processing resources 508 can perform a number of functions. As used herein a module includes a set of instructions included to perform a particular task or action. The number of modules 538, 540, 542 can be sub-modules of other modules. For example, the force provision module 542 can be a sub-module of the insufficiency module 540 and/or can be contained within a single module. Furthermore, the number of modules 538, 540, 542 can comprise individual modules separate and distinct from one another. Examples are not limited to the specific modules 538, 540, 542 illustrated in FIG. 5.

Each of the number of modules 538, 540, 542 can include program instructions and/or a combination of hardware and program instructions that, when executed by a processing resource 508, can function as a corresponding engine as described with respect to FIG. 4. For example, the request module 538 can include program instructions and/or a combination of hardware and program instructions that, when executed by a processing resource 508, can function as the request engine 438, though embodiments of the present disclosure are not so limited.

The machine 544 can include a request module 538, which can include instructions to receive, by a SDDC, a request to provision a virtual object by a stretched cluster according to a storage policy specified as part of the request, wherein the stretched cluster includes a first site and a second site. The machine 544 can include an insufficiency module 540, which can include instructions to determine an insufficiency of storage policy resources at the first site to satisfy the storage policy specified for the virtual object. The machine 544 can include a force provision module 542, which can include instructions to force provision the virtual object responsive to a determination of storage policy resources sufficient to satisfy the storage policy at the second site.

Some embodiments can include instructions to force provision the virtual object responsive to a determination that storage policy resources at the second site are sufficient to configure a full RAID tree associated with the virtual object. The machine 544 can include instructions to configure less than the full RAID tree associated with the virtual object at the first site. The machine 544 can include instructions to configure the full RAID tree associated with the virtual object at the second site.

Figure 6:
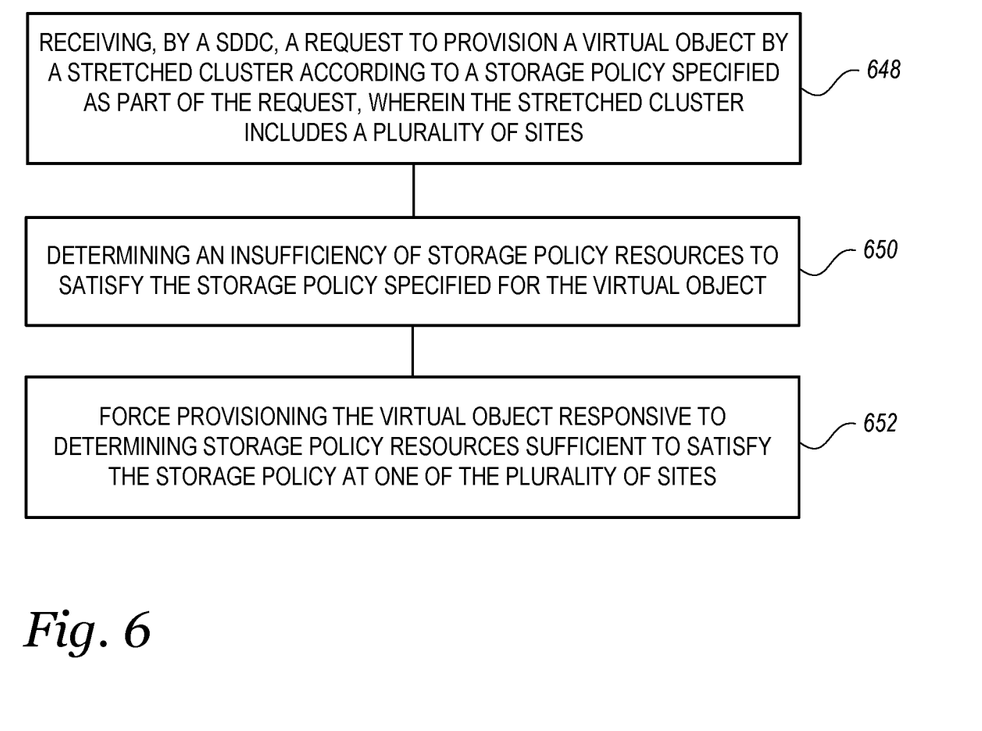
FIG. 6 illustrates a method for force provisioning virtual objects in degraded stretched clusters according to one or more embodiments of the present disclosure.

FIG. 6 illustrates a method for force provisioning virtual objects in degraded stretched clusters according to one or more embodiments of the present disclosure. The method can be performed by a server (e.g., the force provisioning system 114, previously described in connection with FIG. 1), though embodiments of the present disclosure are not so limited.

At 648, the method can include receiving, by a SDDC, a request to provision a virtual object by a stretched cluster according to a storage policy specified as part of the request, wherein the stretched cluster includes a plurality of sites. The storage policy can include a requested mirror quantity, for instance.

At 650, the method can include determining an insufficiency of storage policy resources to satisfy the storage policy specified for the virtual object. In some embodiments, determining an insufficiency can include determining an insufficiency of storage policy resources to satisfy the requested virtual object mirror quantity.

At 652, the method can include force provisioning the virtual object responsive to determining storage policy resources sufficient to satisfy the storage policy at one of the plurality of sites. In some embodiments, force provisioning can include force provisioning the object responsive to determining storage policy resources sufficient to satisfy the requested virtual object mirror quantity at one of the plurality of sites. In some embodiments, force provisioning can include force provisioning the virtual object with a reduced mirror quantity. A reduced mirror quantity (e.g., 0) can be force provisioned responsive to determining storage policy resources insufficient to satisfy the requested virtual object mirror quantity at one of the plurality of sites and determining storage policy resources insufficient to satisfy the requested virtual object mirror quantity at another one of the plurality of sites.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, by a software defined data center (SDDC), a request to provision a virtual object by a plurality of sites of a stretched cluster according to a storage policy specified as part of the request;
   determining an insufficiency of storage policy resources to satisfy the storage policy specified for the virtual object; and
   force provision the virtual object responsive to determining storage policy resources sufficient to satisfy the storage policy at one of the plurality of sites and a previous indication, made using an interface, to force provision the virtual object;
   wherein the storage policy includes a requested virtual object mirror quantity, and wherein the method further includes:
   determining an insufficiency of storage policy resources to satisfy the requested virtual object mirror quantity;
   force provisioning the virtual object with a reduced mirror quantity responsive to:
      determining storage policy resources insufficient to satisfy the requested virtual object mirror quantity at one of the plurality of sites; and
      determining storage policy resources insufficient to satisfy the requested virtual object mirror quantity at another one of the plurality of sites.

2. The method of claim 1, wherein the storage policy includes a requested virtual object mirror quantity, and wherein the method further includes:
   determining an insufficiency of storage policy resources to satisfy the requested virtual object mirror quantity; and force provisioning the object responsive to determining storage policy resources sufficient to satisfy the requested virtual object mirror quantity at one of the plurality of sites.

3. The method of claim 1, wherein the storage policy includes a requested virtual object mirror quantity, and wherein the method further includes:
determining an insufficiency of storage policy resources to satisfy the requested virtual object mirror quantity; and
force provisioning the virtual object responsive to:
determining storage policy resources sufficient to satisfy the requested virtual object mirror quantity at one of the plurality of sites; and
determining storage policy resources insufficient to satisfy the requested virtual object mirror quantity at another one of the plurality of sites.

4. The method of claim 1, wherein determining the insufficiency of storage policy resources to satisfy the storage policy specified for the virtual object includes determining a failure of a host.

5. A non-transitory machine-readable medium having instructions stored thereon which, when executed by a processor, cause the processor to:
receive, by a software defined data center (SDDC), a request to provision a virtual object by a first site and a second site of a stretched cluster according to a storage policy specified as part of the request;
determine an insufficiency of storage policy resources at the first site to satisfy the storage policy specified for the virtual object; and
force provision the virtual object responsive to a determination of storage policy resources sufficient to satisfy the storage policy at the second site and a previous indication, made using an interface, to force provision the virtual object;
wherein the storage policy includes a requested virtual object mirror quantity, and wherein the method further includes:
determining an insufficiency of storage policy resources to satisfy the requested virtual object mirror quantity;
force provisioning the virtual object with a reduced mirror quantity responsive to:
determining storage policy resources insufficient to satisfy the requested virtual object mirror quantity at one of the plurality of sites; and
determining storage policy resources insufficient to satisfy the requested virtual object mirror quantity at another one of the plurality of sites.

6. The medium of claim 5, wherein the first site is geographically separated from the second site.

7. The medium of claim 6, wherein the first site includes a first plurality of hosts, and wherein the second site includes a second plurality of hosts.

8. The medium of claim 7, wherein a failure of at least one of the first plurality of hosts causes the insufficiency of storage policy resources at the first site.

9. The medium of claim 5, wherein the instructions to force provision the virtual object responsive to a determination of storage policy resources sufficient to satisfy the storage policy at the second site include instructions to force provision the virtual object responsive to a determination that storage policy resources at the second site are sufficient to configure a full redundant array of independent disks (RAID) tree associated with the virtual object.

10. The medium of claim 9, including instructions to configure the full RAID tree associated with the virtual object at the second site.

11. The medium of claim 10, including instructions to configure less than the full RAID tree associated with the virtual object at the first site.

12. The medium of claim 5, wherein the virtual object is a virtual computing instance (VCI).

13. The medium of claim 5, wherein the virtual object is a virtual disk.

14. The medium of claim 5, wherein the virtual object is a container.

15. A system, comprising:
a request engine configured to receive, by a software defined data center (SDDC), a request to provision a virtual object by a first site and a second site of a stretched cluster with a first redundant array of independent disks (RAID) configuration according to a storage policy specified as part of the request;
an insufficiency engine configured to determine an insufficiency of storage policy resources at the first site to satisfy the RAID configuration specified for the virtual object; and
a force provision engine configured to force provision the virtual object responsive to a determination that storage policy resources at the second site are sufficient to configure a full RAID tree associated with the virtual object and a previous indication, made using an interface, to force provision the virtual object;
wherein the storage policy includes a requested virtual object mirror quantity, and wherein the method further includes:
determining an insufficiency of storage policy resources to satisfy the requested virtual object mirror quantity;
force provisioning the virtual object with a reduced mirror quantity responsive to:
determining storage policy resources insufficient to satisfy the requested virtual object mirror quantity at one of the plurality of sites; and
determining storage policy resources insufficient to satisfy the requested virtual object mirror quantity at another one of the plurality of sites.

16. The system of claim 15, wherein the force provision engine is configured to force provision the virtual object with:
a full RAID tree configuration at the second site; and
a RAID-0 configuration at the first site.

17. The system of claim 16, wherein:
the insufficiency engine is configured to subsequently determine a sufficiency of storage policy resources at the first site to satisfy the RAID configuration specified for the virtual object; and
the force provision engine is configured to rebuild the full RAID tree configuration at the first site.

18. The system of claim 16, wherein:
the insufficiency engine is configured to subsequently determine a sufficiency of storage policy resources at the first site to satisfy the RAID configuration specified for the virtual object; and
the force provision engine is configured to not rebuild the full RAID tree configuration at the second site.

* * * * *